Oct. 7, 1941.   J. GUTRIDGE   2,258,490
AIRPLANE WING
Filed July 17, 1939   2 Sheets-Sheet 1
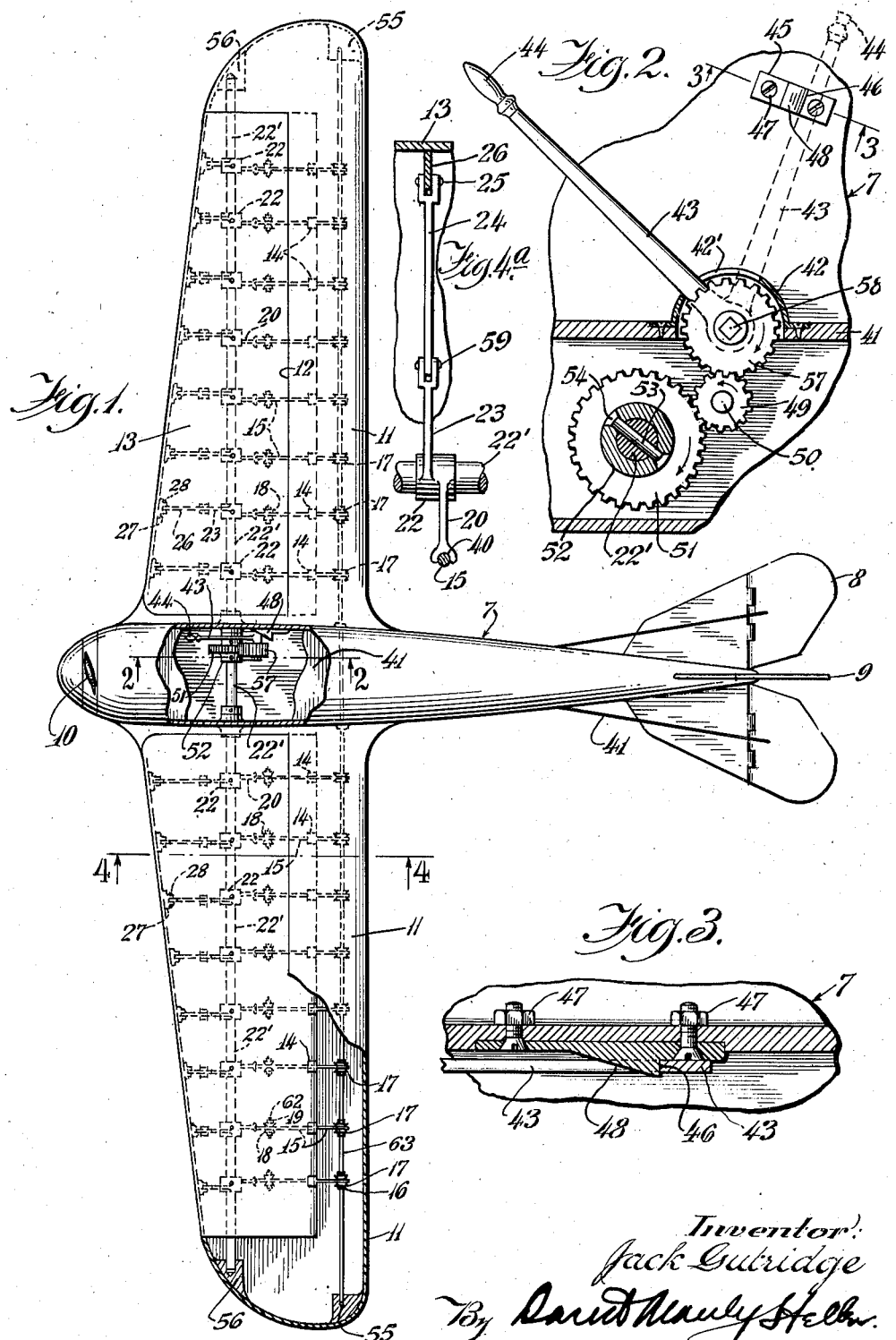
Inventor:
Jack Gutridge Oct. 7, 1941.   J. GUTRIDGE   2,258,490
AIRPLANE WING
Filed July 17, 1939   2 Sheets-Sheet 2
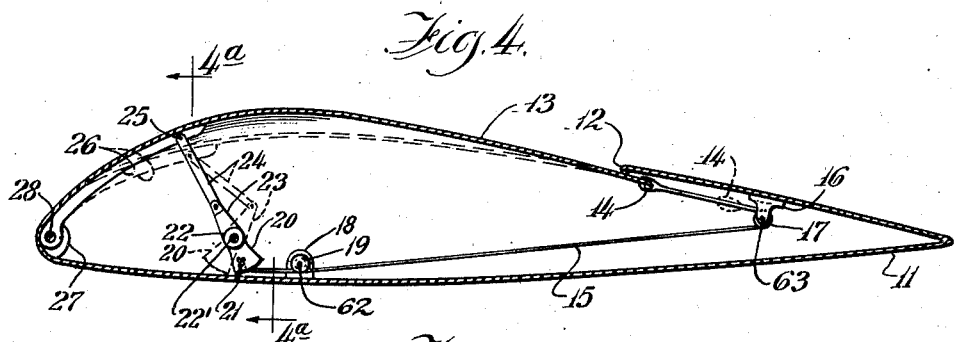
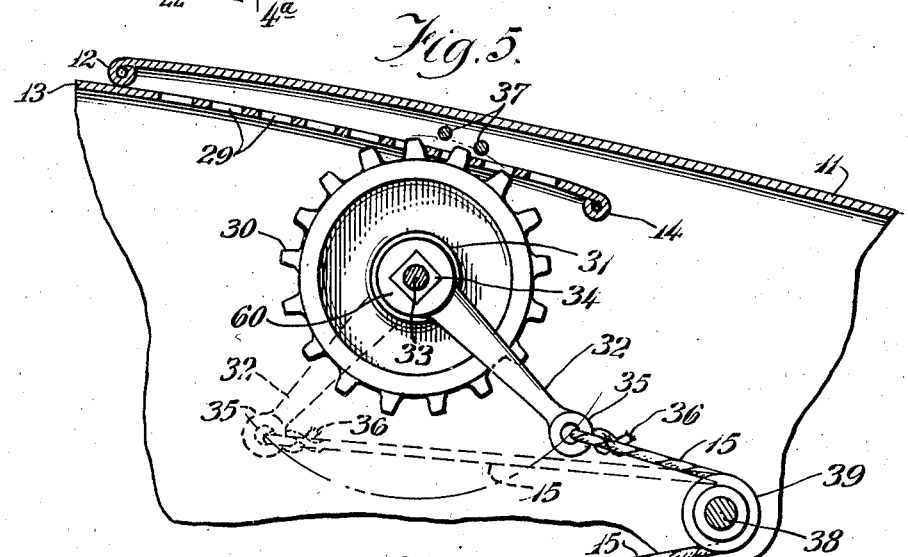
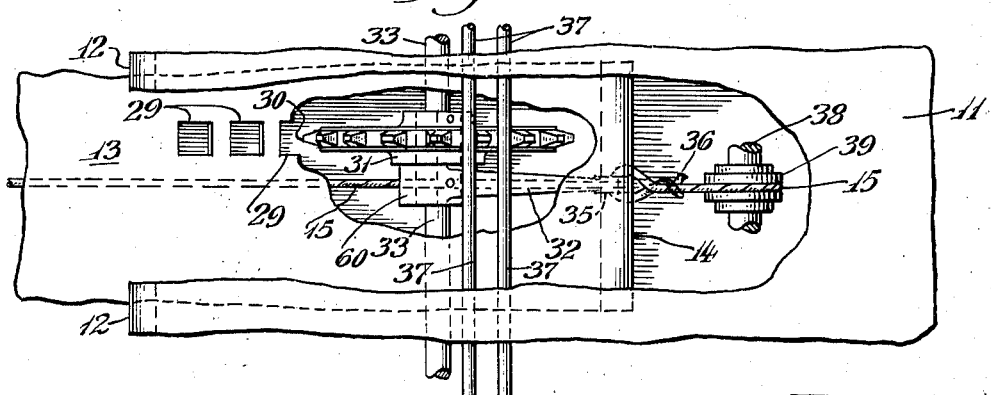
Inventor:
Jack Gutridge
By, David Manly Heller
Attorney Patented Oct. 7, 1941

2,258,490

UNITED STATES PATENT OFFICE 2,258,490

AIRPLANE WING

Jack Gutridge, Chicago, Ill.

Application July 17, 1939, Serial No. 284,818

5 Claims. (Cl. 244—44)

This invention relates to airplane wing construction, and has for its primary object the provision of a variable camber structure in a wing, the general object being to provide a flexible top portion in such a wing, and a series or multiplicity of arcuate levers articulately secured, and provided with mechanism or structure for rotating the said arcuate levers thru an angle which will provide varied degrees of thickness to the front edge portion of a wing of an airplane.

The reason for varying the camber of the wing, is in order to stream-line it for flight in the stratosphere where the resistance of the front portion of the wing should be reduced to a minimum and thus permit flight in a horizontal plane or direction with a minimum of air pressure or resistance.

On the other hand the increase in the thickness or camber of the front portion of the wing is for the purpose of creating greater vacuum on the back of the wing, hence greater lifting moment results. It is a known fact, that in order to lift an airplane from the surface of the ground, it is necessary to travel in a forward direction thus providing a resultant lifting action by the vacuum created on the back portion of the wing.

It is a decided advantage to minimize the forward flight and obtain a greater resultant lifting action, and for this purpose the camber of the front portion of the wing is increased in thickness to afford greater resistance or air pressure against forward flight, and thus tend to provide a greater resultant lifting effect, whereas when the desired height or altitude once having been attained, it is more desirable to have more stream-lined wings, wherein the wind pressure or resistance is reduced to a minimum, further lift not being necessary, thus providing ideal conditions for flight in the stratosphere or in a horizontal direction.

Another object of the invention is to provide a wing structure which may be utilized for defrosting and for preventing the accumulation of ice, sleet, and snow upon the wings, which greatly hamper flight, and also tend to deteriorate the wings and the material from which they are made.

Another advantage of the invention is the provision of a simple, useful, durable construction for the purposes hereinafter to be described, and which is also economical to manufacture or produce in quantity production.

Other objects of the invention may become apparent by reference to the accompanying drawings and the ensuing description wherein like symbols denote like parts and in which;

Fig. 1 represents a top elevational view of an airplane construction showing partially in section that portion of the fuselage where the mechanism or the control for operating my invention is provided. This view also shows the wing structure partly in section, in order to disclose the details of construction.

Fig. 2 is a partial longitudinal cross-sectional view on the line 2—2 of Figure 1.

Figure 3 is a transversal cross-sectional view on the line 3—3 of Figure 2.

Fig. 4 is a longitudinal cross-sectional view on the line 4—4 of Figure 1.

Fig. 4a is a staggered cross-sectional view on the line 4a—4a of Figure 4.

Fig. 5 is a fragmentary cross-sectional view showing a slightly modified arrangement which may be used in place of the connection shown and designated at 14 in Figure 4.

Fig. 6 is a top elevational view of the view shown in Figure 5 with portions broken away in order to show more distinctly the operative structure embodied therein.

Referring particularly to Figure 1, the numeral 7 designates an airplane of standard construction provided with the directional controls generally designated 8 and 9 for piloting the plane in flight.

These controls are operated by the conventional cable structures designated by the numeral 41, which are connected to a common control in the cock-pit of the plane.

The plane is provided with the standard propeller structure designated by the numeral 10 which is in turn operated by suitable motive power means.

The important parts of my invention resides in the structure which comprises the wing designated by the numeral 11, and as can be seen in Figure 4, the wing is preferably made of a springy and flexible material having a shape configurative approximately to that shown in Figure 4.

By referring to Figure 4, it can be seen that the wing structure is made preferably of a durable and flexible material, flexibility being required especially at the portion designated by the numeral 13 for reasons which will be later explained.

The wing section is provided with a reinforcement or ribbed structure as indicated at the point 12, and also at the point designated by the numeral 14.

The bottom portion of the wing 11 may be suitably reinforced with struts or other ribbed members to keep or maintain that rigidly, so that the upper portion 13 will be flexible from the point 14 to the point where the bearings 27 are mounted.

The operating mechanism for manipulating the flexible portion 13 comprises a lever designated by the numeral 20, having an extension to which is attached one end of the cable member 15, being attached at the point designated 21 in any suitable manner.

The lever 20 is pivoted on the shaft designated 22', and has a hub extension designated by the numeral 22, and an arm extension on the opposite side designated by the numeral 23 which is preferably of the forked type. This arm 23 is connected to the lever 24 by means of the pin member 59, and pivoted at its other end by virtue of the pin member 25, to the arcuate lever structure designated by the numeral 26. The shaft 22' is housed in suitable bearings designated by the numeral 56.

The illustration depicted in Figure 4a, amplifies the explanation and permits of a better understanding of the operation of this mechanism.

It will also be noted that the lever 20 is provided at its lower extension with an arcuate or semi-circular recess designated by the numeral 40 which is provided in order to house the cable and locate it definitely in place when the lever is moved or rotated thru the arc that provides the movement of the flexible portion 13 of the wing member 11.

The opposite end of the cable member 15 after being guided under the rollers 19 and 17 which are secured in bearing brackets 18 and 16 respectively, is attached to the end portion of the flexible wing portion 13. The rollers designated 19 are mounted on the shaft 62 whereas the rollers designated 17 are mounted on the shaft 63. The shaft 63 is mounted in the bearings 16 and two end wing bearings designated 55.

The manipulating lever designated by the numeral 43 seen in Figure 2, is provided with a suitable handle portion designated by the numeral 44, and is attached to the square shaft designated by the numeral 58 which is housed in suitable bearings located on the strut 41.

On the square shaft 58 is also mounted the gear designated by the numeral 57 and is caused to operate in unison with the lever 43 whenever it is swung to the dotted position indicated in the drawing Figure 2. This gear 57 is covered by a semi-circular guard designated 42 provided with a slot 42' secured in place by flat head screws.

No doubt it is readily obvious that the slot 42' is of sufficient dimensions to permit the lever 43 to operate freely when moved in the arcuate path it is purported to describe when effecting a change in the chamber of the wing 11.

On some portion, on the side wall of the cockpit is attached the bracket member designated by the numeral 45, it being held securely in place by the screws 46 preferably of a flat head type and the lock nuts designated by the numeral 47.

In the view (Figure 3) it can be seen that this bracket member designated 45 is provided with a cam structure, and also a notched recess designated by the numeral 46, this is provided for the purpose of locking the lever 43 in place once the wing has been reduced to the stream-line or thinner shape at the front end.

This lever 43 when moved to the dotted position shown, will rotate the gear 57 in the direction of the arrow, which in turn will rotate the intermediate gear 49 mounted on the stud 50, and this in turn will rotate the gear designated by the numeral 51 in the direction shown by the arrow.

The gear 51 is provided with a hub member designated by the numeral 52 and is attached to the shaft designated by the numeral 22' by virtue of the pin designated by the numeral 53 which is preferably peened over as indicated at 54 in the counter-sunk portion provided in the hub of the gear designated 52.

In this view (Figure 2) it is clearly illustrated, when the lever 43 is moved to the dotted position indicated, how it locks at the notched portion designated by the numeral 46, and will cause the end 21 of the cable secured to the lever designated 20 to pull upon the flexible wing portion designated 13 and tend to pull it down in place. Simultaneously with this action the rotation of the shaft 22' and the articulate connection to the intermediate lever designated 24 will cause the articulately shaped levers 26 to be brought to the dotted position indicated in the view in Figure 4, thus intensifying the rigidity of the flexible portion 13 of the wing once it has been adjusted to a lesser thickness or dimension.

The levers 26 are mounted swivellably in the bearings designated 27 by virtue of the pivot members designated 28.

Figures 5 and 6 illustrate a slight modification at the point 14 of the flexible wing member. The specific element of construction comprises an added shaft designated by the numeral 33 suitably mounted within the wings of the plane, and on this shaft are mounted a series of sprockets designated by the numeral 30, the inner portion of the flexible wing portion 13 being provided with a series of sprocket holes designated by the numeral 29 to mesh with the teeth of the sprocket 30.

The shafts 37 indicated in that view are for the purpose of maintaining the wing portion provided with the sprocket openings 29, in mesh and alinement with the sprocket members designated 30. The shafts are so mounted as to be radially a suitable distance from the central point of the shaft 33 thus providing clearance for the sprocket teeth designated by the numeral 30.

The sprockets are provided with suitable hubs designated by the numeral 31 and are held in place by lock-nuts designated by the numeral 34 or any other suitable means.

Attached rigidly to each sprocket is a lever designated by the numeral 32, having a hub member designated by the numeral 60 and at its other extremity a boss portion designated by the numeral 35 and provided with a suitably drilled hole therein for the purpose of attaching to it the cable 15 in the manner designated at 36 or any other suitable manner.

With this construction there is provided an additional shaft member designated by the numeral 38, suitably journaled in bearings along the wings of the plane, the construction not being shown, and which is for the purpose of holding rotatably a series of pulleys designated by the numeral 39, which have grooves adapted to receive and guide the cable members 15.

In like manner when the lever member 43 is operated in order to vary the camber of the front portion of the wing, it operates the arcuate levers 26 and it also positively aids the movement of the portion 14 of the wing by virtue of the positive engagement of the sprockets 30 with the sprocket openings designated by the numeral 29; the action being that of bringing the lever 32 into the dotted position indicated in the view in Figure 5, and thus stream-lining the front edges of the wings.

In like manner when it is desired to increase the thickness of the front ends of the wings, the lever 43 is brought back to the normal position shown in Figure 2 at 44.

The flexible construction of the wing will tend to return the lever to its normal position.

It can be seen from the foregoing description that I have provided a useful and meritorious construction which is highly desirable, and should be incorporated in order to facilitate lift and also in order to increase the efficiency of the plane in its horizontal flight in the stratosphere or at any desired altitude where horizontal flying is usually done.

The use of my device will also be extremely beneficial in enabling the pilot or the flyer to operate the flexible wing member occasionally during flight, in order to prevent frost and ice or sleet from accumulating and congealing thereupon, thus enhancing its efficient operation. It is highly desirable to keep the wings free from such dangerous effects of the elements and my structure will also permit of keeping the wings normally clear and will not impede the efficiency or operation of flight.

Applicant wishes to stress particularly the importance of the lever structures 20, 24, and 26 especially the function of the lever 24 which is primarily that of a link connecting the lever 26 to the lever 20 when the device is operated so as to stream-line the wings and reduce the thickness of the front edge thereof; whereas when the lever 43 is manipulated to bring the wing back to its normally thicker shape or position, the function of the link or lever 24 provides a toggle-like action which tends to force the levers 26 back to the normal position and it exerts a sufficient pressure and power necessary to bring back the flexible wing portion 13 to its normal position, the cable 15 balancing the entire action thruout the motion of the lever 43 back to its normal position.

Altho I have herein shown by illustration and description the advantages and features of my invention, and inasmuch as I believe it is susceptible of many modifications, alterations, and improvements, I reserve the right to all such modifications, alterations, and improvements which come within the scope and spirit of the invention; and within the purview of the herein description, my invention to be limited only by the prior art in the Patent Office at the time of the filing of this application, and the subjoined claims.

Having thus described and revealed my invention, what I claim as new and desire to secure by Letters Patent is:

1. An airplane wing having a top surface composed of sections in overlapping relation along a line span-wise of and in the rear half of said surface, the forward section being flexible and its rear edge being in underlying relation with respect to the rear section, means for varying the camber of said wing comprising arcuately shaped levers arranged along and pivoted to the leading portion of the wing and contacting the inner surface of said flexible forward section, a shaft mounted span-wise of the wing and within the same, two armed levers secured to said shaft, rigid link means pivotally connecting one end of one arm of each lever with the free end of each of said arcuately shaped levers, guide means in the rear portion of the wing, and flexible means connected to the end of each of the other arms of said two armed levers and cooperating with said guide means and the rear edge of said flexible top section whereby oscillation of said shaft will vary the camber of the wing.

2. An airplane wing having a top surface composed of sections in overlapping relation along a line span-wise of and in the rear half of said surface, the forward section being flexible and its rear edge being in underlying relation with respect to the rear section, means for varying the camber of said wing comprising arcuately shaped levers arranged along and pivoted to the leading portions of the wing and contacting the inner surface of said flexible forward section, a shaft mounted span-wise of the wing and within the same, two armed levers secured to said shaft, rigid link means pivotally connecting one end of one arm of each lever with the free end of each of said arcuately shaped levers, guide means in the rear portion of the wing, flexible means connected to the end of each of the other arms of said two armed levers and cooperating with said guide means and the rear edge of said flexible top section whereby oscillation of said shaft will vary the camber of the wing, and manipulative means adapted to oscillate said shaft.

3. An airplane wing having a top surface composed of sections in overlapping relation along a line span-wise of and in the rear half of said surface, the forward section being flexible and its rear edge being in underlying relation with respect to the rear section, means for varying the camber of said wing comprising arcuately shaped levers arranged along and pivoted to the leading portion of the wing and contacting the inner surface of said flexible forward section, a shaft mounted span-wise of the wing and within the same, two armed levers secured to said shaft, rigid link means pivotally connecting one end of one arm of each lever with the free end of each of said arcuately shaped levers, guide means in the rear portion of the wing, and flexible means connected to the end of each of the other arms of said two armed levers and secured to the rear edge of said flexible top section, the said flexible means cooperating with said guide means and the rear edge of said flexible top section whereby oscillation of said shaft will vary the camber of the wing.

4. An airplane wing having a top surface composed of sections in overlapping relation along a line span-wise of and in the rear half of said surface, the forward section being flexible and its rear edge being in underlying relation with respect to the rear section, means for varying the camber of said wing comprising arcuately shaped levers arranged along and pivoted to the leading portion of the wing and contacting the inner surface of said flexible forward section, a shaft mounted span-wise of the wing and within the same, two armed levers secured to said shaft, rigid link means pivotally connecting one end of one arm of each lever with the free end of each of said arcuately shaped levers, guide means in the rear portion of the wing, a second shaft mounted span-wise of the wing and within the same, sprocket means mounted on said second shaft, lever means mounted on said second shaft and integrally secured to the said sprocket means, toothed means on the rear edge of said flexible top section cooperating with the said sprocket means, and flexible means connected to the end of each of the other arms of said two armed levers and cooperating with said guide means and the said sprocket means whereby oscillation of said shaft will vary the camber of the wing.

5. An airplane wing having a top surface composed of sections in overlapping relation along a line span-wise of and in the rear half of said surface, the forward section being flexible and its rear edge being in underlying relation with respect to the rear section, means for varying the camber of said wing comprising arcuately shaped levers arranged along and pivoted to the leading portion of the wing and contacting the inner surface of said flexible forward section, a shaft mounted span-wise of the wing and within the same, two armed levers secured to said shaft, rigid link means pivotally connecting one end of one arm of each lever with the free end of each of said arcuately shaped levers, guide means in the rear portion of the wing, a second shaft mounted span-wise of the wing and within the same, sprocket means mounted on said second shaft, lever means mounted on said second shaft and integrally secured to the said sprocket means, toothed means on the rear edge of said flexible top section cooperating with the said sprocket means, shaft means mounted span-wise of the wing and within the same adapted to maintain the said sprocket means in mesh with the toothed means on the rear edge of said flexible top section, and flexible means connected to the end of each of the other arms of said two armed levers and cooperating with said guide means and the said sprocket means whereby oscillation of said shaft will vary the camber of the wing.

JACK GUTRIDGE.